United States Patent
Rolling et al.

(10) Patent No.: US 9,587,585 B1
(45) Date of Patent: Mar. 7, 2017

(54) AUGMENTED PROPULSION SYSTEM WITH BOUNDARY LAYER SUCTION AND WAKE BLOWING

(71) Applicants: August J Rolling, Colorado Springs, CO (US); William H Heiser, Colorado Springs, CO (US); Charles F Wisniewski, Monument, CO (US)

(72) Inventors: August J Rolling, Colorado Springs, CO (US); William H Heiser, Colorado Springs, CO (US); Charles F Wisniewski, Monument, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 444 days.

(21) Appl. No.: 14/231,989

(22) Filed: Apr. 1, 2014

Related U.S. Application Data

(60) Provisional application No. 61/817,703, filed on Apr. 30, 2013.

(51) Int. Cl.
*F02K 3/02* (2006.01)
*B64C 15/14* (2006.01)
*B64C 9/38* (2006.01)

(52) U.S. Cl.
CPC ............. *F02K 3/025* (2013.01); *B64C 9/38* (2013.01); *B64C 15/14* (2013.01)

(58) Field of Classification Search
CPC .. B64C 3/36; B64C 9/38; B64C 15/02; B64C 15/14; B64C 21/02; B64C 21/025;
(Continued)

(56) References Cited

U.S. PATENT DOCUMENTS

| 2,868,479 | A | * | 1/1959 | Kadosch | ................. | B64C 23/00 |
| | | | | | | 244/207 |
| 4,666,104 | A | | 5/1987 | Kelber | | |

(Continued)

FOREIGN PATENT DOCUMENTS

GB          000620409 A * 4/1946 ........... B64C 21/025

OTHER PUBLICATIONS

Century of Flight. Printed Oct. 15, 2013. "Hans von Ohain." http://www.century-of-flight.net/Aviation%20history/jet%20age/Hans%20von%20Ohain . . . .

*Primary Examiner* — Nicholas McFall
(74) *Attorney, Agent, or Firm* — AFMCLO/JAZ; Jason Sopko

(57) ABSTRACT

A system to improve jet engine powered aircraft performance and efficiency includes a jet engine having a pressurized air port configured to convey a pressurized airflow from a compressor or a bypass fan disposed in the jet engine. A primary airfoil has a trailing edge, a top surface, and a boundary region. The system further includes a secondary airfoil disposed at a distance from the top surface of the primary airfoil. The secondary airfoil has a bottom surface and a trailing edge. An exhaust region is formed by the trailing edge of the primary airfoil and the trailing edge of the secondary airfoil. A primary airfoil ejector port and a secondary airfoil ejector port are pneumatically coupled to the pressurized air port. The primary airfoil ejector port is disposed proximate the boundary region and the secondary airfoil ejector port is disposed on the bottom surface.

4 Claims, 5 Drawing Sheets

(58) Field of Classification Search
CPC ......... B64C 21/04; B64C 21/06; B64C 21/08; B64C 2230/04; B64C 2230/06; F02K 3/025
USPC .......................................................... 417/76
See application file for complete search history.

(56) References Cited

U.S. PATENT DOCUMENTS

| | | |
|---|---|---|
| 5,143,329 A | 9/1992 | Coffinberry |
| 6,390,418 B1 | 5/2002 | McCormick et al. |
| 2011/0168809 A1* | 7/2011 | Smith, III ............... B64C 15/02 239/265.23 |

* cited by examiner

AUGMENTED PROPULSION SYSTEM WITH BOUNDARY LAYER SUCTION AND WAKE BLOWING

Pursuant to 37 C.F.R. §1.78(a)(4), this application claims the benefit of and priority to prior filed Provisional Application Ser. No. 61/817,703, filed 30 Apr. 2013, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to apparatus and methods for improved fuel efficiency of jet powered aircraft and, more particularly, to the introduction of bleed air for propulsion augmentation and drag reduction.

BACKGROUND OF THE INVENTION

Operators of both military and civilian aircraft constantly endeavor to reduce the expenses associated with use of the aircraft. Since fuel consumption represents a significant portion of an aircraft's operating expenses, improved fuel efficiency is a persistent goal. To that end, it has been observed that jet engines are most propulsively efficient when a large mass of air is accelerated at a modest rate (contrasted with the fuel consumption experienced when a lower volume of air undergoes significant acceleration).

One technique for increasing the volume of propulsive air is to employ a turbofan configuration of the jet engine. In a turbofan configuration, a core portion includes a compressor, fuel injection means, and turbine. A quantity of the air entering the engine's inlet is introduced into the core and is subsequently compressed, fueled, and combusted. Another portion of the air entering the inlet bypasses the core and this relatively dense air is joined with the combusted airflow aft of the jet engine. The ratio between the mass flow rate of air that bypasses the engine core (un-combusted air) to the mass flow rate passing through the engine core that is involved in combustion, may be referred to as the bypass ratio (BPR).

While this technique is effective at increasing fuel efficiency, it necessitates a larger diameter engine that has diminished thrust capacity when compared with a low BPR or pure turbojet configuration (particularly at higher airframe speeds).

Efficiency also suffers from resulting pressure drag at the location of flow separation near the top of an airfoil near the leading edge (i.e., the boundary region), the size of the engine nacelle, and wake turbulence. While techniques have been previously employed to mitigate these sources of inefficiency, traditional remedial measures have focused on piecemeal resolution of the aforementioned sources of drag.

Therefore, a need exists for apparatus and methods of improving jet engine fuel efficiency by production of high volume propulsive airflow, while mitigating a plurality of drag sources.

SUMMARY OF THE INVENTION

The present invention overcomes the foregoing problems and other shortcomings, drawbacks, and challenges of previous attempts at improved jet engine fuel economy. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the disclosed invention, a system to improve jet engine powered aircraft performance and efficiency is provided. The system includes a jet engine having a pressurized air port configured to convey a pressurized airflow from a compressor or a bypass fan disposed in the jet engine. A primary airfoil has a trailing edge, a top surface, and a boundary region. The system further includes a secondary airfoil disposed at a distance from the top surface of the primary airfoil. The secondary airfoil has a bottom surface and a trailing edge. An exhaust region is formed by the trailing edge of the primary airfoil and the trailing edge of the secondary airfoil. A primary airfoil ejector port and a secondary airfoil ejector port are pneumatically coupled to the pressurized air port. The primary airfoil ejector port is disposed proximate the boundary region and the secondary airfoil ejector port is disposed on the bottom surface.

According to another embodiment of the disclosed invention, a method of reducing fuel consumption, exhaust temperature, or acoustic emissions of a jet engine powered aircraft is provided. The method includes providing a primary airfoil and a secondary airfoil separated by an injection region. The method further includes introducing a pressurized airflow from the primary airfoil and from the secondary airfoil into the ejection region, wherein the pressurized airflow from the primary airfoil is introduced near a boundary region. An ambient airflow is combined with the pressurized airflow in the ejection region. The method further includes ejecting a mix of pressurized airflow and ambient air from an exhaust region aft of the ejection region.

A method of controlling the orientation of an aircraft in flight is provide. The method includes providing an aircraft having a primary airfoil and a secondary airfoil. The method further includes adjusting a pressurized airflow exiting an ejector port of the primary airfoil or the secondary airfoil to create a pressure differential between the pressurized airflow exiting the ejector port of the primary airfoil with respect to the pressurized airflow exiting the secondary airfoil. The method further includes combining ambient air with the pressurized airflow.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
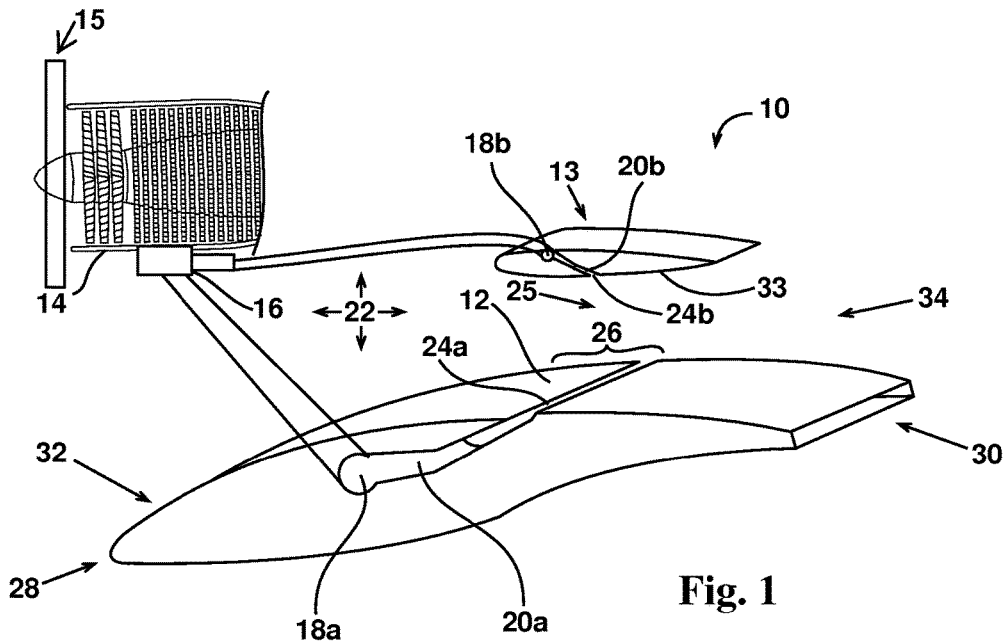
FIG. 1 is a perspective cutaway illustration of primary and secondary airfoils according to an embodiment of the disclosed invention.
Figure 3:
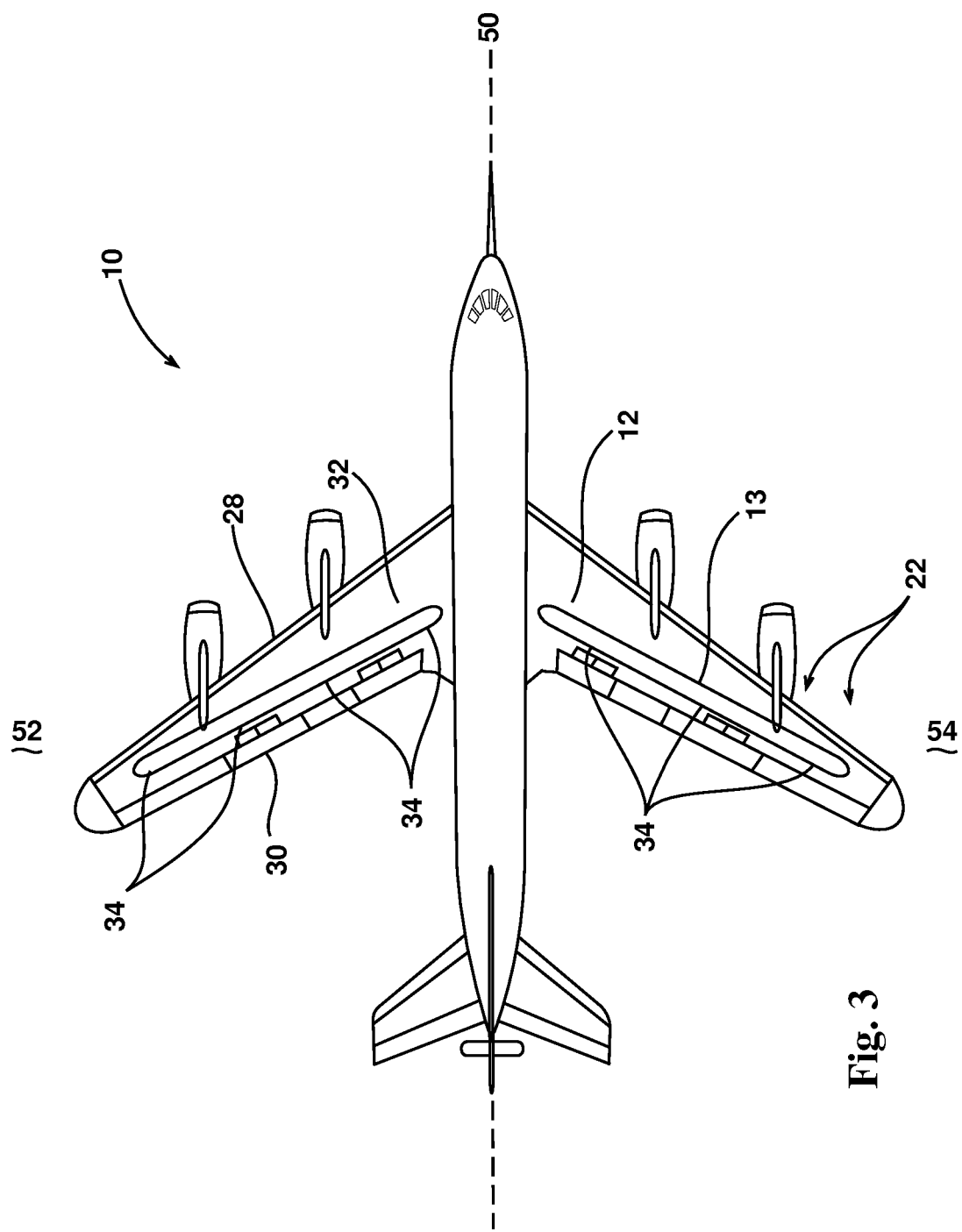
FIG. 3 is a top view of an aircraft including the disclosed invention.

Turning attention to FIG. 1, a partial cross sectional perspective illustration shows an embodiment of the augmented propulsion system with boundary layer suction and wake blowing 10. The system 10 includes a primary airfoil 12, a secondary airfoil 13, and a compressor 14 as part of an aircraft (as shown in FIG. 3). The primary airfoil 12 and secondary airfoil 13 may be supported in a spaced arrangement by use of pylons or other structures known to one of ordinary skill in the art. In the alternative, engine nacelles or other structure surrounding a propulsion duct or exhaust may be disposed between the first airfoil 12 and the second airfoil 13 for support thereof.

The compressor 14 may comprise a single compressor stage disposed in a single jet engine assembly or a plurality of compressor stages disposed in a single assembly. The compressor 14 includes a pressurized air port 16 configured to convey air pressurized by the compressor 14. It should be noted that this pressurized airflow is bled off prior to introduction of fuel or combustion thereof. The pressurized air from the compressor 14 (also referred to as bleed air) is conveyed through the pressurized air port 16 to plenums 18a and 18b.

It will be recognized by one of ordinary skill in the art that the bleed air may be substituted with bypass air, wherein the pressurized air is obtained from a bypass fan 15. In such applications, the pressurized air port 16 is configured to intercept a portion of the pressurized air from the bypass fan (also referred to as bypass air), for use by the system 10. The bleed air or bypass air may be collectively referred to as pressurized air or pressurized airflow.

The plenums 18a and 18b may extend along the length of the airfoils 12 and 13 from a location originating near the compressor 14 to a distance therefrom. In some embodiments of the system 10, a single compressor 14 pressurizes a length of plenum 18a or 18b that extends substantially along the entire length of the airfoil 12 or 13. In other embodiments of the system 10, either of plenum 18a or 18b may be segmented into a plurality of sections and distributed along the length of the airfoil 12 or 13. Each segment may be pressurized by a dedicated compressor 14. Additionally, conduits or passageways known to one of ordinary skill in the art may be used to distribute a plurality of pressurized air ports 16 to a given segment of the plenum 18, or conversely, to connect a plurality of segments of the plenum 18a or 18b to a single compressor 14. In some embodiments of the disclosed invention, the ejector port 24b (explained in greater detail below) is disposed approximately coincident with an imaginary line segment that extends orthogonally from the primary airfoil top surface 23. Additionally, each of ejector ports 24a and 24b may be disposed at an angle of 30 to 45 degrees with respect to the primary airfoil top surface 32 and secondary airfoil bottom surface 33, respectively. An exhaust region 34 is formed at the aft end of the primary airfoil 12 and secondary airfoil 13.

The plenums 18a and 18b are pneumatically coupled to corresponding ducts 20a and 20b that terminate in corresponding ejector ports 24a and 24b. The ejector ports 24a and 24b lead to ambient air 22 and they may be proximate the boundary region 26. The location of the boundary region 26 varies with the geometry of a given primary airfoil 12, but coincides with the position wherein laminar air flowing from the leading edge 28 toward the trailing edge 30 along the primary airfoil top surface 32 transitions to turbulent airflow. As with the plenums 18a and 18b, the ejector ports 24a and 24b may be continuous along the length of the airfoils 12 and 13, or may be segmented (with either space between the segments, or with each segment substantially in contact with its adjacent segment).

In use, according to on embodiment of the disclosed invention, as the airfoils 12 and 13 are propelled through the air, bleed air travels from the compressor 14, to the pressurized air port 16, to the plenums 18a and 18b, through the corresponding ducts 20a and 20b located at the boundary region 26 of the primary airfoil top surface 32 and secondary airfoil bottom surface 33, and out the ejector ports 24a and 24b. Ambient air 22 is simultaneously merged with the bleed air in the injection region 25 disposed between the primary airfoil top surface 32 and secondary airfoil bottom surface 33. The combination thereof exits the ejector port 24 formed near the trailing edge 30 of the primary airfoil 12 and of the secondary airfoil 13.

The entrainment of bleed air into the ambient air 22 serves to improve efficiency in several ways. The entrained air is accelerated causing a significant thrust augmentation on the order of 2-4 with an effective bypass ratio many times larger than with a conventional system. A significant benefit is gained by the reduction of skin friction in the boundary region 26. This reduced drag improves aerodynamic performance, reduces engine load, and ultimately permits use of a physically smaller powerplant and associated nacelle (for outboard applications). Consequently, fuel consumption for a given load is greatly reduced by the thrust augmentation, decreased skin friction, reduction of power plant footprint, and reduced associated drag. Additionally, because a large amount of entrained airflow is mixed with the higher temperature exhaust air, the thermal signature is decreased. The ability to entrain flow that would otherwise separate means a powerful way of achieving circulation control or extremely high coefficients of lift.

The introduction of the bleed air mixture into the aircraft's wake is effective to reduce wake drag. As a result, aerodynamic efficiency is improved, and fuel efficiency increases. Additionally, the expulsion of the bleed air mixture augments thrust and increases the propulsive performance of the system 10. The enhanced propulsive efficiency allows for use of smaller diameter engines, and correspondingly reduced drag from the engine structure. As an additional benefit, propulsion via an additional charge of low-velocity high-density air allows engine exit velocities to be reduced. Since engine noise is proportional to the eighth power of exit velocity, substantial improvements in overall noise may be realized. Therefore, incorporation of these features may allow operators to comply with urban noise regulations that are otherwise unachievable with large airframes.

Figure 2:
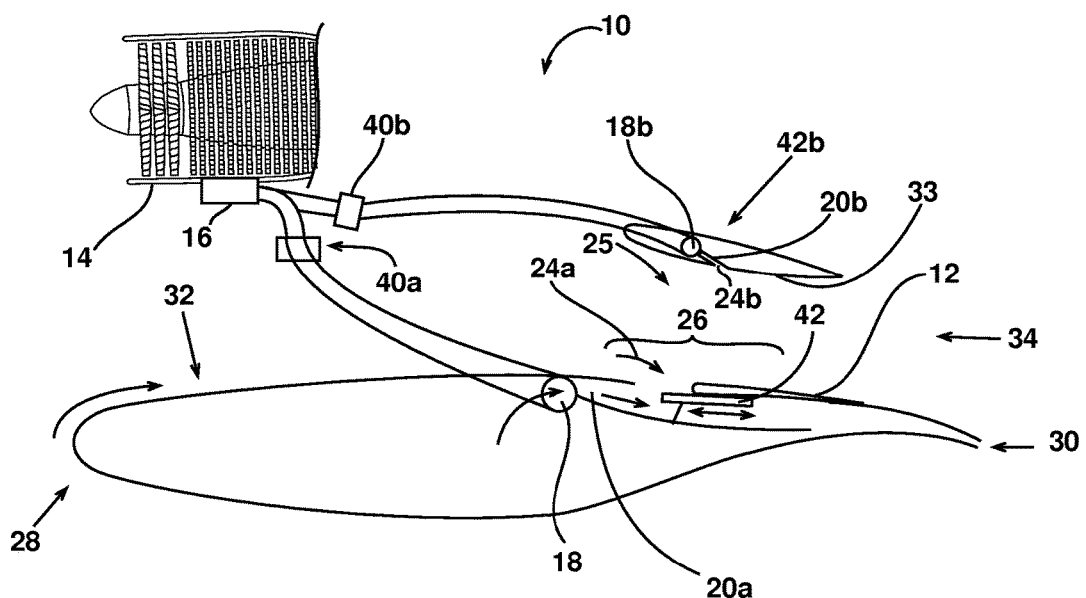
FIG. 2 is a side cutaway illustration of primary and secondary airfoils according to an embodiment of the disclosed invention.

Turning attention to FIG. 2, a side view cutaway of an embodiment of the system 10 is shown. Each of the previously discussed features is presented in this alternate view, and the figure numbers are consistent with those used to identify elements in FIG. 1. A valve body 40a and 40b may be disposed between the pressurized air port 16 and the plenum 18a or 18b. The valve body 40a or 40b is configured to adjustably restrict the passage of pressurized air from the compressor 14 to the rest of the system 10. Depending upon flight conditions, the bypass air introduced into the system 10 may be throttled between a minimum and maximum value. It should be noted that the valve body 40a or 40b may produce acceptable results if disposed at locations that differ from the depiction in FIG. 2. For example, the valve body 40a or 40b may be disposed between the plenum 18a or 18b and the duct 20a or 20b. Additionally, as will be recognized by one of ordinary skill in the art, a plurality of valve bodies 40 may be used to provide a variable degree of control among a plurality of ducts 20a or 20b (for example, when the plenums 18a or 18b or ejector ports 24a or 24b are segmented), or for asymmetric control with respect to the centerline of the aircraft (i.e., making adjustments to the left wing that are dissimilar from the right wing).

Additionally, an actuator door 42 may be disposed proximate the opening of the ejector ports 24a and 24b. The actuator doors 42 may use any mechanism known to one of ordinary skill in the art, to include pivoting flaps, linearly translating plate, rotating disk with varied apertures, or the like. The actuator door 42 may be used to provide a variable degree of entrainment of bleed air independent of the bleed air regulated by the valve body 40a or 40b. Or, the actuator doors may be used to vary the location wherein bleed air exits the primary airfoil 12 or secondary airfoil 13 (so as to adjust the spatial relationship between the bleed air and the boundary region 26).

Through designed fluidics control of the entrained flow, control authority could be achieved without the use of conventional moving surfaces. By directing the entrained flow through internal valving or external nozzle regulation, the flow leaving the exhaust region 34 in FIG. 3. could obviate the need for conventional, pitch, yaw, and roll surfaces. Any desired directional movement would require an equal and opposite vectorized acceleration of flow. For example, in FIG. 3. to direct the nose of the airplane to angle to the left, a greater acceleration flow from the exhaust region 34 located to the right of the centerline 50 would be required. To coordinate the turn, a design flow decrease from the left of the centerline 50 would be required. Likewise, pitch may be impacted by adjusting the differential of pressurized air exiting ejector port 24a versus ejector port 24b. For example increasing the airflow out of ejector ports 24b of the auxiliary airfoil 13 will produce a downward flow at the exhaust port 24. If this differential is established symmetric about the centerline 50, the airframe will pitch. Conversely, if the differential is established asymmetrically about the centerline 50, the airframe will roll. Given appropriate location of exhaust regions and cooperating internal or external valving, substantially all mechanical control surfaces may be obviated.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 4:
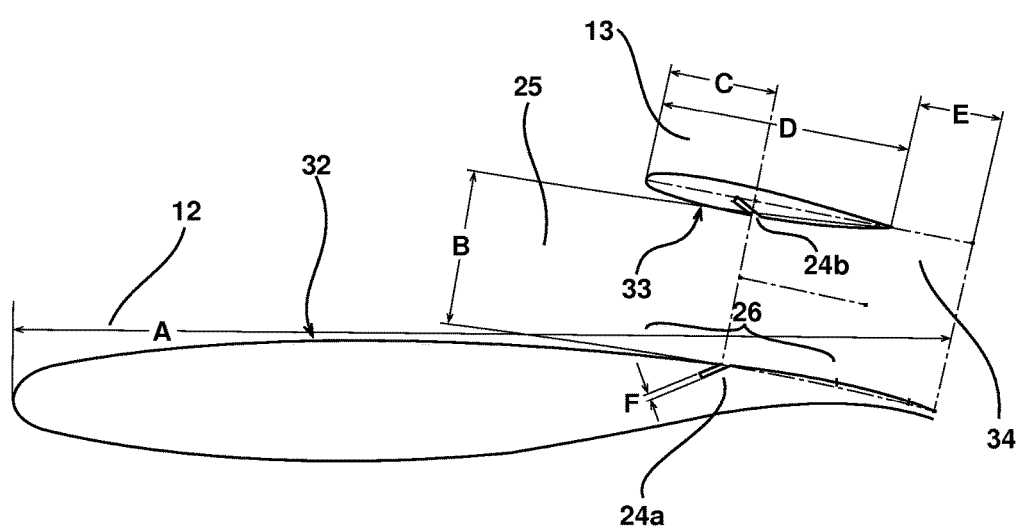
FIG. 4 is a side cutaway illustration of a primary and secondary airfoil according to an embodiment of the disclosed invention.
Figure 5:
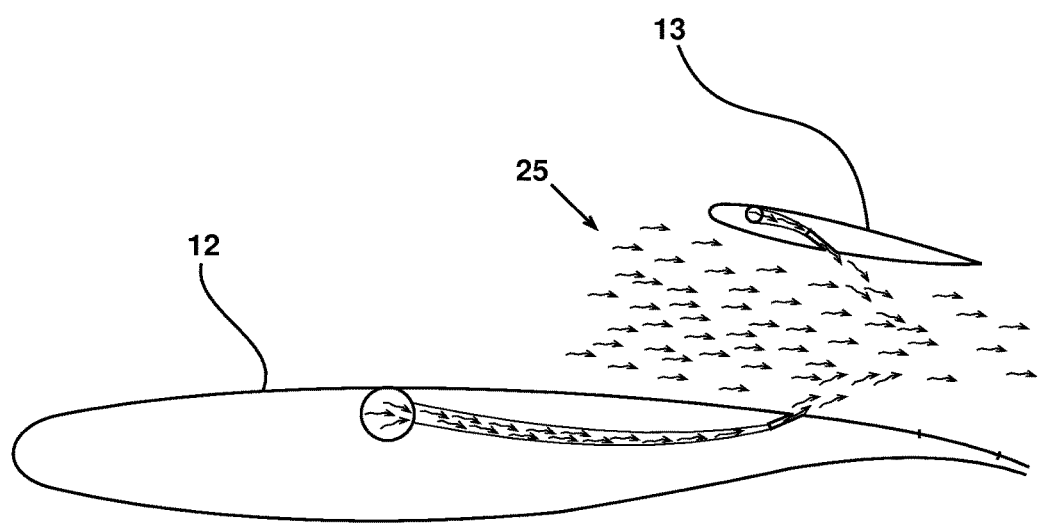
FIG. 5 is a side cutaway illustration of airflows according to an embodiment of the disclosed invention.

Turning attention to FIGS. 4 and 5, a cross sectional illustration of an embodiment of the system 10 is shown. The primary airfoil 12 and secondary airfoil 13 have been shown in a simplified form to highlight the spatial relationships between various elements. Experimental testing has revealed that a ratio of secondary airfoil width D to primary airfoil width A provided acceptable results at 1:3. This ratio of primary airfoil 12 to secondary airfoil 13 provides the required channel geometry to produce a low pressure zone near the exhaust region 34. Although larger secondary airfoils 13 may produce airworthy results, the associated skin friction and weight may negatively impact overall system performance. In one embodiment of the disclosed invention, the following combination of dimensions yielded coefficients of lift greater than 8 where the airfoil would otherwise have stalled. This is at least a 4-fold increase in thrust of an otherwise non-augmented flow, which accounts for the total impact of thrust augmentation and drag reduction. The exemplary normalized values are as follows: A=216, B=48, C=31, D=72, E=24, and F=1. The listed values are unit-less, and represent scalar relationships between the various elements. Additionally, effective boundary region 26 suction and wake augmentation may be achieved by inclining the ejector ports 24a and 24b at 30 to 45 degrees with respect to the primary airfoil top surface 32 and secondary airfoil bottom surface 33, respectively. As of this application, the computational fluid dynamic analysis shows that larger angles than 45 degrees and smaller angles than 30 degrees do not provide the same drop in pressure that causes flow entrainment. One benefit of higher angles is greater flow penetration for mixing. One benefit of lower angles is re-energizing the boundary layer reducing skin friction. FIG. 5 illustrates the comingled flow from the primary airfoil 12, secondary airfoil 13, and ambient air 25.

Figure 6:
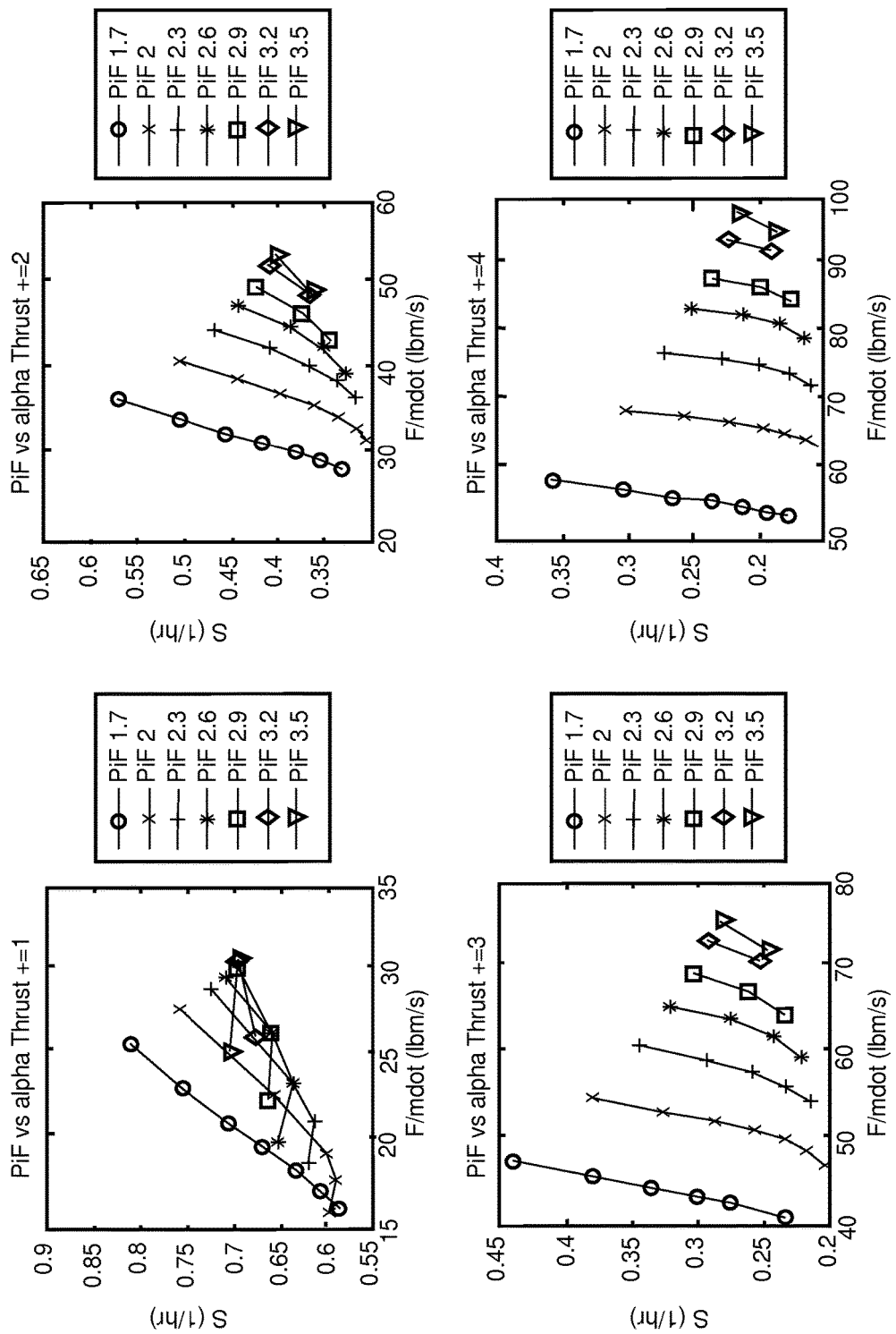
FIG. 6 is a quartet of graphs denoting simulated results of the disclosed invention.

The sub-figures of FIG. 6 are commonly referred to as "carpet plots". They show the relative performance merits, uninstalled specific thrust (F/mdot), and uninstalled thrust specific fuel consumption (S) for a family of possible engines. The engines in the graphed simulation of the disclosed invention used component efficiencies for engines that will be built between 2005-2025. The design flight condition was M=0.8 with alt=35 kft. The Turbine Inlet Temperature was 3600 R and the compressor pressure ratio was 35. For distributed systems with thrust augmentation, the entire bypass flow was augmented, representing a primary flow comprising all bypass. The independent variables were PiF (fan pressure ratio), alpha (bypass ratio), and thrust augmentation (Thrust+). The fan pressure ratio was varied from 1.7 to 3.5, the thrust augmentation was varied from 1 to 4, and the bypass ratio was varied from 4 to 10.

Starting with the top left sub-figure of FIG. 6, this family of engines has a thrust augmentation of 1, in other words, it represents no distributed ejector, or conventional bypass ratio engines. Moving to the top right sub-figure, this family of engines has a thrust augmentation of 2. This is the conservative estimate used for determining fuel savings even though experiment and CFD analysis indicate possible thrust augmentations above 4. Moving through the bottom left to bottom right sub figures, the thrust augmentation is increased from 3 to 4, respectively.

The simulation results indicate that as thrust augmentation is increased, the fuel economy improves (e.g., thrust specific fuel consumption decreases holding all other variables constant). Additionally, the engine diameter required to achieve a particular amount of thrust is decreased with increasing thrust augmentation. This is represented by the increasing depicted specific thrust.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system to improve jet engine powered aircraft performance and efficiency, the system comprising:
   a jet engine having a pressurized air port configured to convey a pressurized airflow from a compressor or a bypass fan disposed in the jet engine;
   a primary airfoil having a trailing edge, a top surface, and a boundary region;
   a secondary airfoil disposed at a distance from the top surface of the primary airfoil, the secondary airfoil having a bottom surface and a trailing edge;
   an exhaust region formed by the trailing edge of the primary airfoil and the trailing edge of the secondary airfoil;
   a primary airfoil ejector port and a secondary airfoil ejector port pneumatically coupled to the pressurized air port;
   wherein the primary airfoil ejector port is disposed proximate the boundary region and the secondary airfoil ejector port is disposed on the bottom surface; and
   an actuating door configured to adjustably occlude the primary airfoil ejector port or a secondary airfoil ejector port.

2. A system to improve jet engine powered aircraft performance and efficiency, the system comprising:
   a jet engine having a pressurized air port configured to convey a pressurized airflow from a compressor or a bypass fan disposed in the jet engine;
   a primary airfoil having a trailing edge, a top surface, and a boundary region;
   a secondary airfoil disposed at a distance from the top surface of the primary airfoil, the secondary airfoil having a bottom surface and a trailing edge;
   an exhaust region formed by the trailing edge of the primary airfoil and the trailing edge of the secondary airfoil;
   a primary airfoil ejector port and a secondary airfoil ejector port pneumatically coupled to the pressurized air port;
   wherein the primary airfoil ejector port is disposed proximate the boundary region and the secondary airfoil ejector port is disposed on the bottom surface; and
   wherein the primary airfoil ejector port or the secondary airfoil ejector port is oriented at 30 to 45 degrees with respect to the top surface or the bottom surface, respectively.

3. A method of reducing fuel consumption, exhaust temperature, or acoustic emissions of a jet engine powered aircraft, the method comprising:
   providing a primary airfoil and a secondary airfoil separated by an injection region;
   introducing a pressurized airflow from the primary airfoil and from the secondary airfoil into the ejection region, wherein the pressurized airflow from the primary airfoil is introduced near a boundary region;
   combining an ambient airflow with the pressurized airflow in the ejection region; and
   ejecting a mix of pressurized airflow and ambient air from an exhaust region aft of the ejection region; and
   wherein the pressurized airflow is introduced at an angle of thirty to forty-five degrees with respect to the ambient airflow.

4. A method of controlling the orientation of an aircraft in flight, the method comprising:
   providing an aircraft having a primary airfoil and a secondary airfoil;
   adjusting a pressurized airflow exiting an ejector port of the primary airfoil or the secondary airfoil to create a pressure differential between the pressurized airflow exiting the ejector port of the primary airfoil with respect to the pressurized airflow exiting the secondary airfoil;
   combining ambient air with the pressurized airflow; and
   wherein the pressure differential is reduced to substantially zero to yaw the aircraft.

* * * * *